United States Patent [19]

Vogt

[11] 4,064,820

[45] Dec. 27, 1977

[54] APPARATUS FOR THE MARINE TRANSSHIPMENT OF A LIQUID

[75] Inventor: Christoph Vogt, Monaco

[73] Assignee: Single Buoy Moorings Inc., Fribourg, Switzerland

[21] Appl. No.: 745,534

[22] Filed: Nov. 29, 1976

[30] Foreign Application Priority Data

July 30, 1976 Netherlands .......................... 7608513

[51] Int. Cl.$^2$ ............................................. B63B 25/08
[52] U.S. Cl. ............................. 114/74 R; 137/355.16; 141/279; 214/13
[58] Field of Search ..................... 114/74 R, 72, 230; 9/8 P; 141/279, 284, 387, 388; 137/355.16, 355.17, 355.19, 355.2, 355.23; 214/13, 15 R, 15 B

[56] References Cited

U.S. PATENT DOCUMENTS

| 3,766,938 | 10/1973 | Stracke et al. ................... | 141/279 X |
| 3,833,032 | 9/1974 | Hnot ................................. | 141/279 X |
| 3,921,684 | 11/1975 | Allen ................................ | 141/279 |

Primary Examiner—Duane A. Reger

Assistant Examiner—Sherman D. Basinger
Attorney, Agent, or Firm—Young & Thompson

[57] ABSTRACT

Apparatus for the marine transshipment of a liquid such as oil from a supply tanker to a transport tanker, comprises an elongated vessel having a horizontal track portion extending lengthwise thereof. The horizontal track terminates adjacent one end of the vessel in an inclined track portion that extends down to the end of the vessel at least as low as the water line. Horizontal rails extend along opposite sides of the horizontal track portion and beyond the horizontal track over the inclined track portion. A trolley rides on these rails and is winch-operated to pull a flexible conduit up onto the horizontal track portion when the conduit is not in use for the transshipment of liquid. When the trolley moves in the opposite direction and the conduit is extended, the end of the conduit attached to the trolley will swing up when the trolley passes beyond the horizontal track portion; and in this swung-up position, a conduit connected to a liquid storage space in the vessel can be raised and lowered into and out of coupling engagement with the vertically swung conduit end.

2 Claims, 4 Drawing Figures

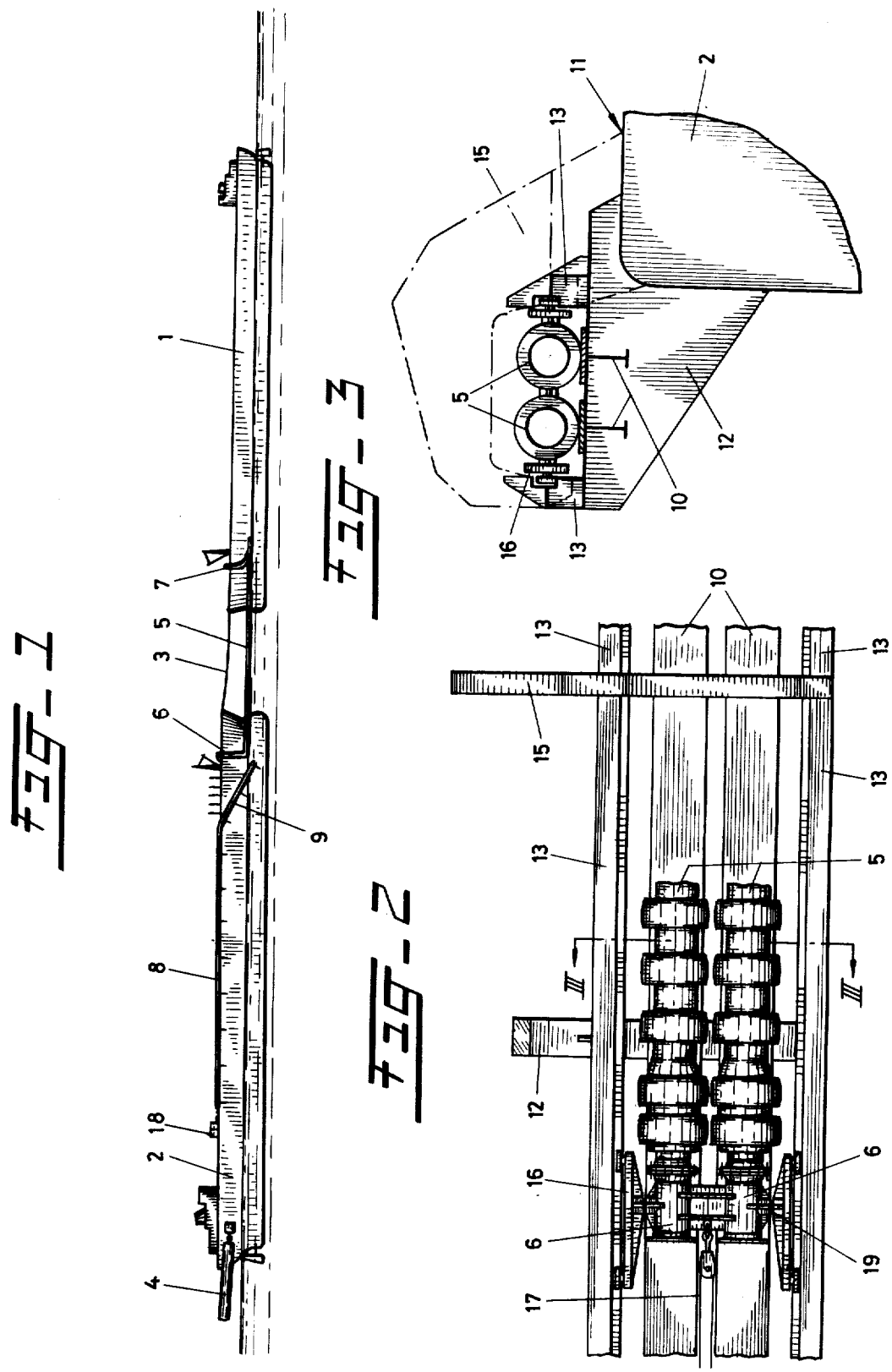

APPARATUS FOR THE MARINE TRANSSHIPMENT OF A LIQUID

The invention relates to an installation for the transshipment of a fluid, in particular petroleum from a floating installation, for example moored to a single point mooring buoy, in particular from a supply tanker to a transport tanker, the latter being suited to be moored to the supply tanker while at least one conduit for the transfer of the fluid from one tanker to the other is provided of which the end connections can be coupled to couplings.

Hitherto, it was usual for the transfer conduit to remain floating on the water when the installation is not operating. The big disadvantage of this is that the conduit is constantly exposed to the forces and waves of the water causing rapid wear of the conduit; and repair work is very difficult to carry out in the case of a floating conduit.

The object of the invention is to obviate this drawback.

This object is achieved in that according to the invention, the floating installation is provided with a horizontally extending guide track for the conduit which extends to a point near the rear end of the floating installation, and at this point passes into a section sloping towards the rear end and extending as far as, or below, the water level, whilst the overall length of the complete guide track is at least approximately equal to the length of the conduit, and means are provided for pulling the conduit over the guide track.

Preferably, said means for pulling the conduit over the guide track consist of rails on either side of the horizontal section of the track, and a trolley movable over these rails to which trolley the pipe end connections to be coupled to the floating installation are or can be connected, as well as means for moving the trolley.

Advantageously, the rails may extend farther from said end of the horizontal sectin of the track to the rear end of the floating installation. The end connection may then be mounted for pivotal movement about a horizontal shaft disposed transversely to the track in the trolley.

The invention is explained further by referring to the drawings, in which an exemplary embodiment of the invention is shown.

FIG. 1 is a side view of a supply tanker arranged according to the invention and a transport tanker moored behind it.

FIG. 2 shows a top view, on a larger scale, of a part of the guide track on the supply tanker.

FIG. 3 is a cross-section taken on line III—III in FIG. 2.

Figure 4:
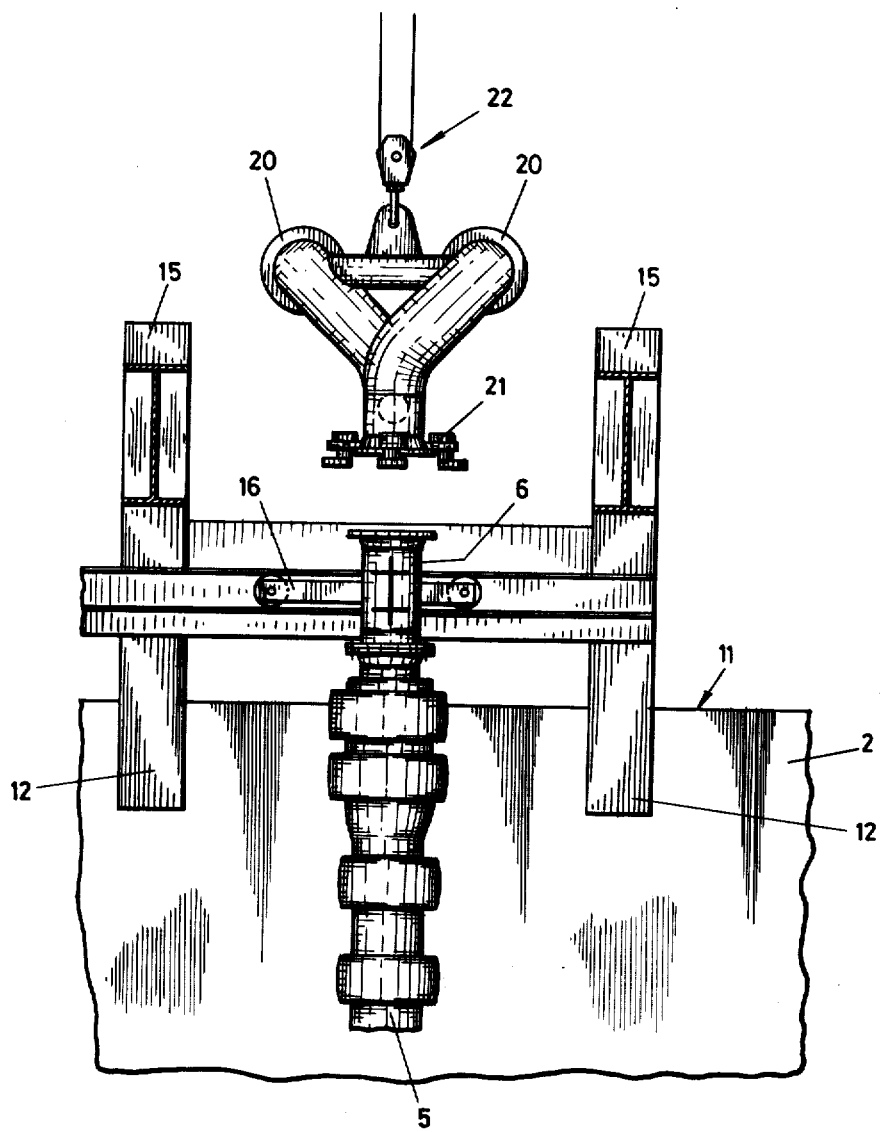
FIG. 4 is a view on a larger scale of the end of the guide rails.

As shown in FIG. 1, a transport tanker 1 is moored in alignment with and at a distance from the floating installation or supply tanker 2 by means of hawsers 3. The supply tanker 2 is moored to a single point mooring buoy (not shown) by means of the arms 4, and the tankers 1 and 2 are kept spaced apart behind each other. From the supply tanker 2 the floating conduits or hoses 5 are transferred to the transport tanker 1, and then the end connections 6 and 7 of these hoses are coupled to the tankers 2 and 1 respectively.

The supply tanker 2 is equipped with a guide track made up of a horizontal section 8 and a sloping section 9.

As shown in FIGS. 2 and 3, the guide track is made up of sectional girders 10, which are supported by brackets 12, fixed to the hull 11 in spaced apart relation.

On either side of section 8 of the guide track, rails 13 are mounted; and where this section passes into the sloping guide track section 9, they continue horizontally to a point situated approximately vertically above the end of the sloping section 9. To support this continuing section of the rails, supports 15 are provided.

Movable over the rails 13 is a trolley 16, to which a cable 17 is attached which extends to the winch 18. The connecting ends 6 of the floating conduits 5 are fixed in the trolley 16 by means of the horizontal trunnions 19, thus allowing the coupling ends 6 to swing in a vertical plane.

When the loading of the transport tanker 1 is completed, the connecting ends 7 of the floating conduits 5 are uncoupled, leaving the conduits 5 for the greater part floating in the water. The new hawser 3 is cast off and the tanker 1 can sail away.

The connecting ends 6 of the floating conduits 5 on the supply tanker 2 can now be uncoupled, after which the conduits 5, can be retracted over the guide track 8, 9 by means of the winch 18.

When an empty transport tanker 1 is moored to the supply tanker 2 as shown in FIG. 1, the floating conduits 5 can be pulled from the guide tracke 8, 9 to the transport tanker 1 by means of a line. After passing the end of the horizontal guide track 8, the connecting ends 6 in the trolley 16 tilt through 90° so that at the end of the rails 13 these ends are in an upright position (see FIG. 4), to allow the two discharge pipes 20 on the tanker 2 to be coupled to the end connections 6 by means of the high speed couplings 21, which discharge pipes can be moved by lifting means 22 (not shown in detail).

What is claimed is:

1. Apparatus for the marine transsshipment of a liquid, comprising an elongated vessel, a guide track having a horizontal portion extending lengthwise of said vessel to a point near one end of the vessel, the track from said point then having a downwardly inclined portion toward said end of the vessel to at least the water level, a flexible conduit, the guide track being at least about as long as the conduit, means for pulling the conduit lengthwise along the guide track, said means for pulling the conduit along the track comprising a pair of rails on either side of the horizontal section of the track and a trolley movable along said rails, one end of said conduit being connected to said trolley, and means for moving the trolley along the rails, the rails extending beyond said horizontal portion of the track to the end of said vessel, said end of said conduit being pivotally mounted on said trolley for vertical swinging movement about a horizontal axis, so that when said trolley moves beyond said horizontal portion of the track above said inclined portion of the track, said end of said conduit will pivot relative to said trolley.

2. Apparatus as claimed in claim 1, and means for raising and lowering a further conduit for connection to the first-mentioned coduit when said first-mentioned conduit has move beyond said horizontal portion of the track and has swung vertically relative to said trolley.

* * * * *